United States Patent [19]

Coles, Jr.

[11] Patent Number: 4,776,169

[45] Date of Patent: Oct. 11, 1988

[54] GEOTHERMAL ENERGY RECOVERY APPARATUS

[76] Inventor: Otis C. Coles, Jr., P.O. Box 12155, El Paso, Tex. 79912

[21] Appl. No.: 151,824

[22] Filed: Feb. 3, 1988

[51] Int. Cl.[4] ............................................. F03G 7/00
[52] U.S. Cl. ..................................... 60/641.2; 165/45
[58] Field of Search ................ 60/641.2, 641.3, 641.4, 60/641.5, 676; 165/45

[56] References Cited

U.S. PATENT DOCUMENTS

| | | |
|---|---|---|
| 2,461,449 | 2/1949 | Smith et al. . |
| 3,274,769 | 9/1966 | Reynolds ............................ 60/641.2 |
| 3,482,625 | 12/1969 | Bray . |
| 3,648,767 | 3/1972 | Balch . |
| 3,857,244 | 12/1974 | Faucette ............................ 60/641.2 |
| 4,052,857 | 10/1977 | Altschuler . |
| 4,094,356 | 6/1978 | Ash et al. . |
| 4,187,686 | 2/1980 | Pommier . |
| 4,201,060 | 5/1980 | Outmans . |
| 4,512,156 | 4/1985 | Nagase . |
| 4,553,502 | 11/1985 | Dreuilhe et al. . |
| 4,642,987 | 2/1987 | Csorba et al. . |
| 4,644,750 | 2/1987 | Lockett et al. . |

Primary Examiner—Allen M. Ostrager
Attorney, Agent, or Firm—Arnold, White & Durkee

[57] ABSTRACT

Geothermal energy may be recovered through an underground well drilled to a depth approaching the earth's magma by circulation of injected heat transfer fluids flowing along separate parallel paths within closed loops extending into the well. One or more of the injected fluids may be conducted by a heat transfer portion of the loop establishing a lower heat absorbing zone within the well exposed to superheating conditions at ultra-deep depths. Circulation of the fluid within said heat transfer portion may be prolonged to efficiently absorb heat and heat loss may be minimized by heat exchange relationships between the parallel flow paths above the lower heat absorbing zone.

14 Claims, 3 Drawing Sheets

GEOTHERMAL ENERGY RECOVERY APPARATUS

BACKGROUND OF THE INVENTION

This invention relates in general to the recovery of energy from below the earth's surface and more particularly to improvements to such energy recovery systems.

In recent years, commercial utilization of geothermal energy has acquired greater status and interest because of the long-range dwindling of fossil fuel sources of energy and tragic experiences with nuclear power plants.

Presently available technology associated with geothermal energy recovery, is primarily directed to the extraction of heat from readily available natural resources located within the earth's crust and readily exposed by the drilling of relatively shallow wells. Such geothermal energy recovery systems are disclosed for example in U.S. Pat. Nos. 2,461,449, 3,274,769, 4,052,857, 4,094,356, 4,201,060, 4,512,156, 4,642,987 and 4,644,750. The readily available geothermal resources to which such prior art technology is adaptable, includes for example hot artesian wells and similar naturally occurring sources of vented steam or super heated water as referred to in U.S. Patent No. 3,274,769 to Reynolds. Other naturally occurring and readily available geothermal sources include salt formations as referred to in U.S. Pat. No. 4,052,857 to Altschuler. The latter types of naturally occurring geothermal sources of energy located within the earth's crust layer, are not available in all locales for which reason utilization of geothermal energy fro such sources has been limited.

Geothermal energy is, of course, available at greater depths below the earth's surface, such as the mantle layer. However, the tapping of geothermal energy from such ultra-deep depths within the earth's mantle or zones approaching the magma have not been seriously considered heretofore because of expected heat losses in extracting energy from such depths. It will, however, be apparent that the extraction of geothermal energy from ultra-deep wells extending to the earth's mantle, will not be limited to restricted locales. By reason thereof, the provision of an economically efficient geothermal energy recovery system adaptable for ultra-deep wells offers the advantage of utilizing existing above-surface electrical power generating equipment and installations so as to avoid the relocation and construction of new generating plants adjacent to restricted locales.

It is therefore an important feature of the present invention to provide a method and apparatus for enhancing geothermal energy recovery to such an extent so as to avoid the restricted locale limitations heretofore associated with prior art geothermal recovery systems.

It is an additional feature of the present invention to provide a geothermal energy recovery system which may be utilized with existing electric power generating installations so as to avoid relocation and construction of new generating plants near or adjacent to naturally occurring geothermal resources.

Another feature of the present invention is to provide an economical and easily fabricated apparatus which may be installed in new or existing wells suitable for geothermal energy recovery.

Still another feature of the present invention is to provide a method and apparatus which can be easily manufactured and installed yet efficiently recover geothermal energy from the earth's crust.

SUMMARY OF THE INVENTION

In accordance with the present invention, two or more appropriate heat transfer fluids, such as water, are injected under pressure into an underground well for flow along separate parallel conduits which form closed circulating loops into and out of heat producing zones below the earth's surface from which heat is to be extracted. Heat absorbing zones are established at selected intervals in the wellbore through which the transfer fluids are conducted. Preferably, each fluid is conducted through its heat absorbing zone by a travel prolonging portion of its circulating loop through which increased heat transfer occurs from the geothermal source. Above the heat absorbing zone within the well, the return portions of the circulating loops preferably form a heat exchanging arrangement to minimize loss of heat absorbed from the geothermal source during travel of the fluids up to the above surface equipment.

In accordance with one embodiment of the invention, the travel prolonging portion of the circulating loops are formed by flattened tubing having axially extending tube sections circumferentially spaced about the inner surface of the well casing and interconnected at opposite axial ends defining the axial limits of a heat exchange zone through which at least one of the circulating loops extends. Another heat exchange zone is located above the lowermost heat exchange zone through which another of the circulating loops extends.

Displacement of the fluids through the heat absorbing zones may occur at a reduced linear flow rate as compared to the inflow and outflow rates of the fluids through the injection and discharge portions of the loops so as to achieve the desired increased heat absorption. This may be accomplished by expanding the cross-section flow area of each fluid within the heat absorbing zone. Where the well is drilled to a depth approaching the magma of the earth's mantle, the prolonged travel of the fluid through the heat absorbing zone may insure that it is vaporized under the superheating conditions of the surrounding geothermal environment.

In a preferred embodiment, a solid conduit supporting block separates the lower heat absorbing zone from the heat exchange zone thereabove within the well. The fluid injection and discharge portions of the loops which extend through the upper zone are interconnected with the travel prolonging portions of the loops. One of the circulating loops within the well is limited to a depth above the lower heat absorbing zone and conducts its fluid in heat transfer relation to the other geothermal heat absorbing fluid in the injection and discharge portions of the loops.

These, together with other features and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF THE PREFERRED EMBODIMENT

Figure 1:
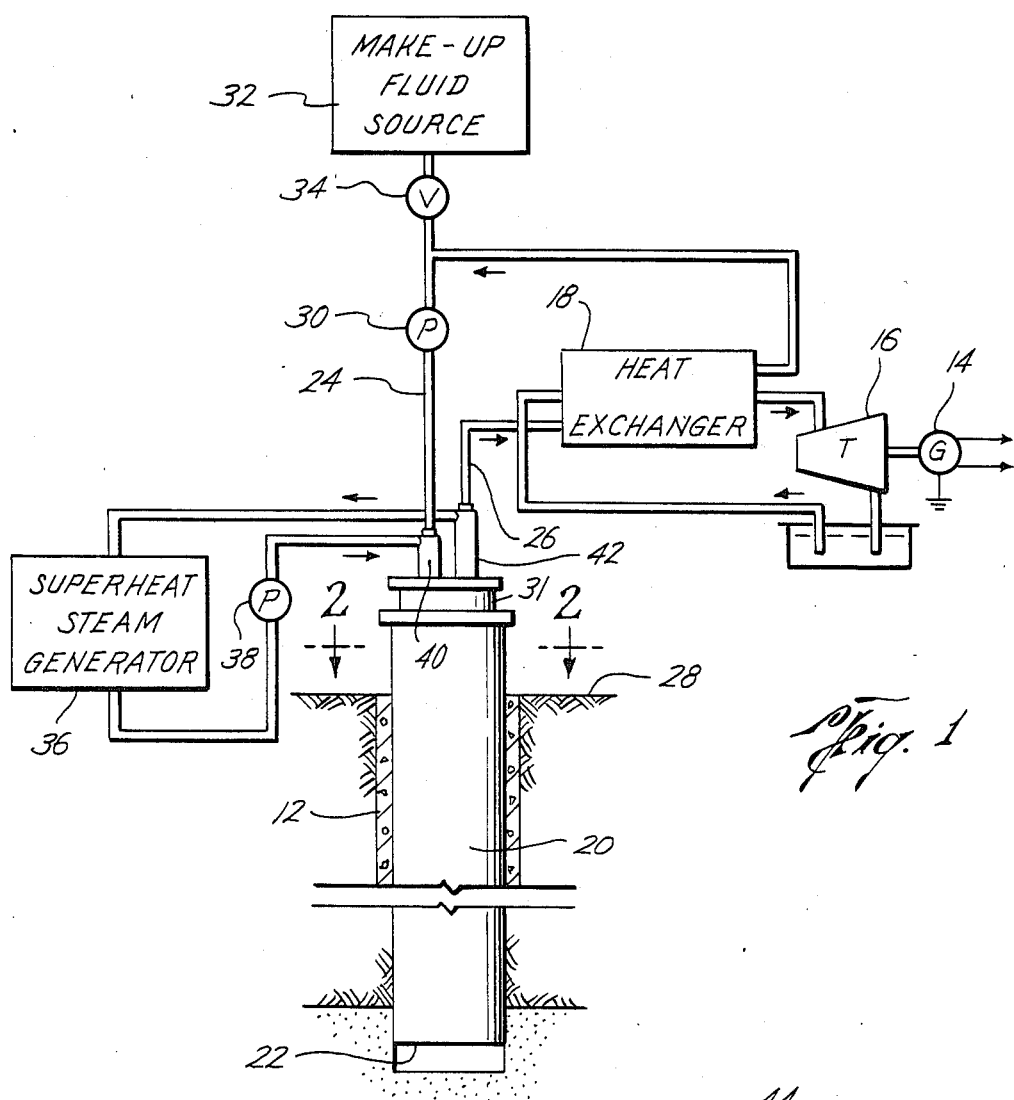
FIG. 1 is a diagrammatic view with parts shown in section of a geothermal energy recovery system in accordance with an embodiment of the present invention.

Referring now to the drawings and detail, FIG. 1 schematically illustrates an overall view of a geothermal energy recovery installation in accordance with the preferred embodiment of the present invention. The installation is established by drilling a vertical underground well 12 at a convenient location adjacent to existing electric power generating equipment including, for example, an electrical generator 14 driven by a steam turbine 16 through which the steam is circulated from a heat exchanger 18 within which heat absorbed from the geothermal source within the well 12 is extracted. Unless there is a naturally occurring heat source, the well is drilled to a depth approaching the earth's magma where extremely high temperatures are encountered. However, it should be appreciated that the present invention may be installed in wells of any depth as long as sufficient geothermal energy is available. A tubular casing 20 is installed in the wellbore as shown in FIG. 1 to protect upper water zones and maintain the bore opening yet allow geothermal heat to be absorbed at selected intervals and at its lower end 22 within the wellbore.

In the illustrated embodiment of FIG. 1, one of two heat transfer fluids, such as water for example, is injected into the well casing through injection tubing 24, such fluid being withdrawn from the well casing after absorption of geothermal heat by means of discharge tubing 26. The injection and discharge tubing 24 and 26 form part of a closed flow circulating loop which extends downwardly into the wellbore as will be described in detail hereinafter. The circulating loop above the surface 28 extends through the heat exchanger 18 within which the absorbed heat is extracted. The heat absorbing fluid is pressurized by pump 30 and then carried by the injection tubing 24 back to the well 12 through a tubing connector assembly 31. A source of makeup fluid 32 may be connected to the intake side of pump 30 through a valve 34.

A second heat transfer fluid which may be derived, for example, from a superheating steam generator 36 in the illustrated embodiment, is circulated within the well casing 20 by means of a pump 38 through the connector assembly 31. This second fluid provided by pump 38 is circulated into the well through injection tubing 40 similar to the first fluid in injection tubing 24. Injection tubing 40 thus forms part of a second closed circulating loop extending into the well casing from which the second fluid is withdrawn by a second discharge tubing 42 to complete the second closed loop above ground through the steam generator 36.

The terms "fluid" and "transfer fluid" are being used in their broadest sense and are intended to include any liquid, gas, or liquid/gas mixture having appropriate heat transfer characteristics for the particular conditions under which the present invention is to be operated.

Figure 2:
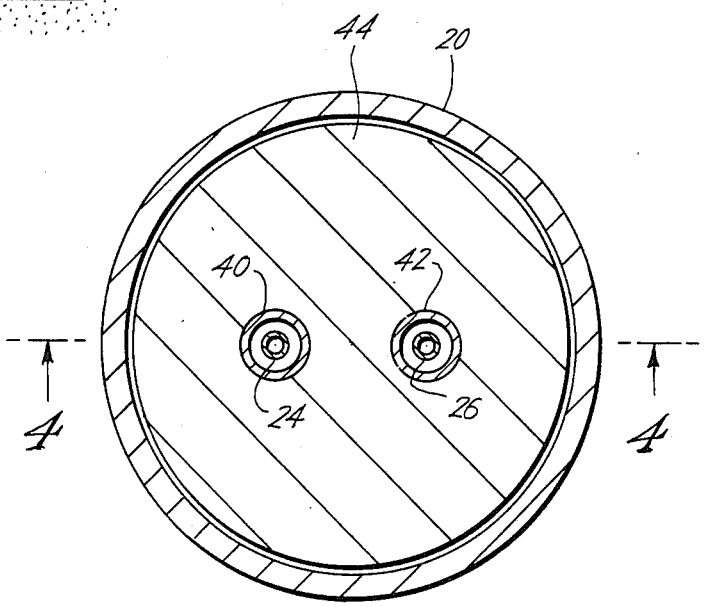
FIG. 2 is an enlarged transverse section view taken substantially through a plane indicated by section line 2—2 in FIG. 1.
Figures 3, 4:
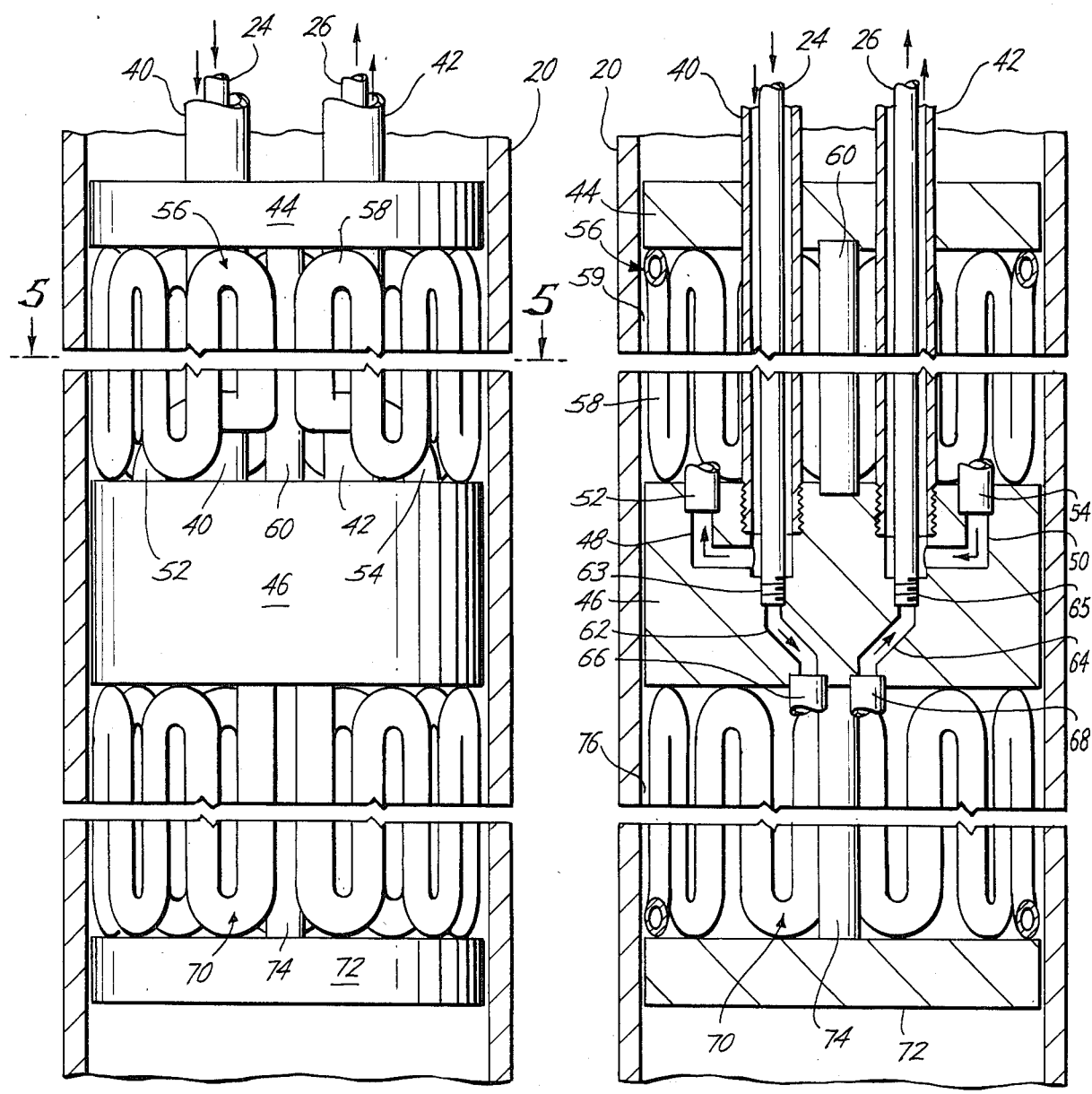
FIGS. 3 and 4 are a partial side section of the invention and a cross section view taken substantially through a plane indicated by section line 4—4 in FIG. 2.

Referring now to FIGS. 2 and 3 in particular, the injection tubing 24 and 40 enter the upper end of the well casing 20 from the connector assembly 31 in coaxial relationship to each other. Tubing 40 is supported by and extends through one or more upper tubing support disks 44. The injection tubing 24 through which the first fluid is conducted, is disposed inside of the other injection tubing 40 so as to form an annular space therebetween through which the second fluid is conducted in heat transfer relationship to the first fluid conducted through the inner tubing 24. As shown by the arrows in FIG. 3, the two fluids are accordingly conducted by the tubing 24 and 40 along parallel paths in the same direction. Similarly, the discharge tubing 26 conducts the first fluid upwardly to the above surface equipment aforementioned in heat transfer relationship to the second fluid conducted by the outer tubing 42 in the same upward direction within the annular space formed by the outer tubing 42 about the inner tubing 26. Tubing 42 is also supported by and extends through the upper tubing support disk 44 as shown.

Both sets of injection and discharge tubings extend in parallel spaced relationship to each other from the uppermost tubing support disk 44 downwardly into the well casing and terminate at their lower ends within a mid-section tubing support block 46. As shown in FIG. 4, the lower ends of both sets of tubings are connected as for example by a threaded connection, to the support block 46 which is provided with passages 48 and 50 to respectively establish fluid communication between the annular passages enclosed by the injection and discharge tubings 40 and 42. The passages 48 and 50 have sealed connections 52 and 54, as more clearly seen in FIGS. 4 and 5, to opposite ends of a fluid travel prolonging conduit arrangement generally referred to by reference numeral 56. The travel prolonging conduit arrangement 56 is formed by a series of closely spaced loop sections of vertically extending, partially flattened tube sections 58 of oval cross-section (see FIG. 5) preferably coated with a ceramic coating to reduce deterioration from corrosion and electrolysis effects. The tube sections 58 are partially flattened towards the periphery of the well casing 20 to increase their surface area adjacent the heat source outside the well casing 20, thereby maximizing heat absorption by the circulating fluid. The closely spaced pairs of vertical tube sections 58 are circumferentially spaced from each other adjacent to the internal cylindrical surface of the well casing 20 and in encircling relation to the sets of injection and discharge tubings 24, 26, 40, 42. Further, the tube section 58 forming the travel prolonging conduit arrangement 56, are interconnected at opposite axial ends within the well casing to define a heat exchange zone 59 between an upper tubing support 44 and the mid-section tubing support block 46. The upper support 44 and mid-section support block 46 are interconnected and spaced from each other by a stabilizer column 60. The travel prolonging conduit arrangement 56 establishes fluid communication between the injection tubing 40 and discharge tubing 42 to thereby limit its associated circulating loop to the depth of the mid-section tubing support block 46 according to the illustrated embodiment as hereinbefore described. Thus, the fluid conducted by the annular region between tubing 24 and 40 and between tubing 26 and 42 is circulated through the travel prolonging conduit arrangement 56. This fluid may be used to transport energy in and of itself or it may be used to take advantage of a high temperature, upper axial zone within the well casing to prevent heat loss from the fluids during flow downwardly through the injection tubing 24 and upwardly through the discharge tubing 26.

Figure 5:
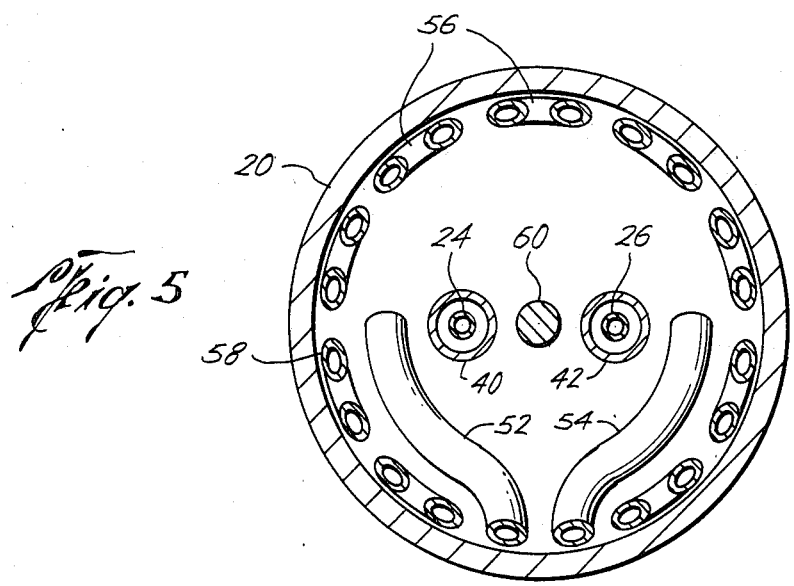
FIG. 5 is a transverse section view taken substantially through a plane indicated by section line 5—5 in FIG. 3.
Figure 6:
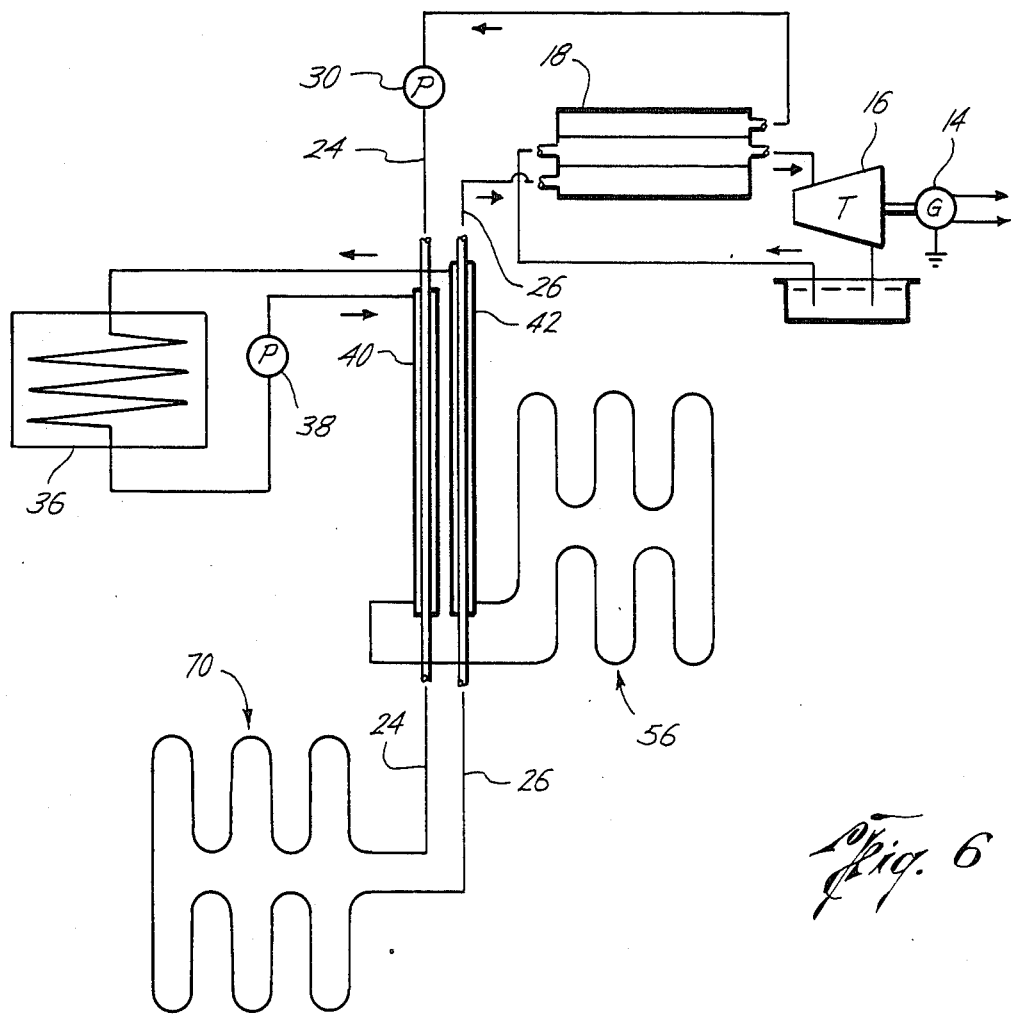
FIG. 6 is a fluid flow diagram corresponding to the system illustrated in FIGS. 1-5.

Referring now to FIGS. 4 and 5 in particular, the mid-section tubing support block 46 is formed with passages 62 and 64 respectively aligned with the lower threaded end portions 63, 65 of the injection tubing 24 and discharge tubing 26 through which the first fluid is conducted for geothermal heat absorbing purposes. Passage connections 66 and 68 respectively connect the block passages 62 and 64 to the ends of another travel prolonging conduit arrangement 70 similar in configuration to that of the conduit arrangement 56 hereinbefore described. The conduit arrangement 70, however, extends axially between the mid-section support block 46 and a lower support block 72 interconnected therewith by a second stabilizer column 74 to establish the axial limits of a lower heat absorbing zone 76 below upper zone 59 within the well casing. Because of the travel prolonging configuration of the conduit arrangement 70, the fluid conducted therethrough absorbs heat from the geothermal source and delivers such heat to above surface equipment in a most efficient manner. Where the well extends to a depth approaching the earth's magma, superheating conditions may exist within the lower heat absorbing zone 76 so as to cause vaporization of the fluid within the conduit arrangement 70. The conduit arrangement 70 furthermore completes the closed circulating loop within lower zone 76 through which the heat absorbing fluid is conducted as more completely diagrammed in FIG. 6.

As can be appreciated, the embodiment of FIGS. 3-5 may be expanded to utilize multiple heat exchange zones by the use of several tubing support blocks 46 arranged between tube sections 58. For example, additional coaxial injection tubes may be placed around tubes 24, 40 in order to form a series of annular spaces capable of separately conducting more than two fluids down into the well to support blocks 46 when the outermost annular region is diverted to a tube section 58 for heat absorption as shown in FIG. 4 with the remaining, concentric injection tubes continuing downwardly to the next support block 46 when another fluid is provided to another tube section and so on until there are multiple tube sections heated at selected intervals in the well. As illustrated in FIG. 4, the discharge tubes 26, 42 may have additional concentric discharge tubes to separately conduct fluid out of the well. In short, by using multiple concentric injection and discharge tubes and by allowing the concentric injection and discharge tubes to pass through block 46 with only the outermost tube terminating and conducting its fluid to the passages 48, 50, it is possible to construct a series of tube sections for energy recovery in a single well.

In the preferred embodiment of the invention hereinbefore described, fluids injected into the well casing travel along closed circulating loops along parallel paths in the same direction. It will be appreciated by those having skill in the art that various modifications can be made to conduit arrangements 56 and 70 without departing from the spirit or scope of the invention. For example, the tubing within the heat zones 59 and 76 might take the form of helical or other circulation prolonging configurations. Furthermore, each fluid might be split into a plurality of tubings and circulated through the heat zone in separate flow paths. Alternatively, the tubing within the heat zones 59 and 76 might be removed to provide an open chamber through which the fluids would pass. Such an arrangement would prolong circulation of the fluids within the heat zones by expanding the cross-sectional area of flow, thereby reducing the linear flow rates of the fluids as compared to the injection and discharge linear flow rates. In this case, it would be preferable to position connectors 52, 54 and 66, 68, at peripherally opposite positions from one another to maximize the travel path of the fluid within the zones 59 and 76.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention. For example, the circular or flattened cross-sectional shape of the conduits may be replaced with other cross-sectional shapes. Furthermore, other axial or helical tube arrangements, or combinations thereof, may be used to provide the travel prolonging conduits, thereby increasing heat absorption by the fluids therein. Likewise, it is believed that the direction of flow of one or both of the heat transfer fluids may be changed without departing from the spirit of this invention.

What is claimed is:

1. An apparatus for recovering geothermal energy from a wellbore by using a first and a second heat transfer fluids, the apparatus comprising:
    means for respectively injecting the fluids into the wellbore, including injection conduit means for conducting the fluids down the well in separate parallel flow paths at respective linear flow rates;
    first heat transfer means connected to the injection conduit means for circulating the first fluid through a first heat absorbing zone within the well;
    second heat transfer means connected to the injection conduit means for circulating the second fluid through a second heat absorbing zone located above the first heat absorbing zone;
    means for respectively discharging the fluids out of the wellbore, including discharge conduit means connected to the first and second heat transfer means for conducting the fluids up the well in separate parallel flow paths.

2. The apparatus of claim 1, wherein the flow paths of the discharge conduit means are in heat exchange relationship with one another.

3. The apparatus of claim 2, wherein the flow paths of the injection conduit means are in heat exchange relationship with one another.

4. The apparatus of claim 1, wherein the discharge conduit means comprise two coaxial tubes, the inner tube connected to the first heat transfer means for conducting the first fluid up from the first heat absorbing zone, and the outer tube connected to the second heat transfer means for conducting the second fluid up from the second heat absorbing zone in surrounding and heat exchange relationship with the first fluid.

5. The apparatus of claim 4, wherein the injection conduit means comprise two coaxial tubes, the inner tube connected to the first heat transfer means for conducting the first fluid down to the first heat absorbing zone, and the outer tube connected to the second heat transfer means for conducting the second fluid down to the second heat absorbing zone in surrounding and heat exchange relationship with the first fluid.

6. The apparatus of claim 1, wherein at least one of the heat transfer means includes means for prolonging the circulation of the respective fluid through the respective heat absorbing zone.

7. The apparatus of claim 6, wherein the circulation prolonging means comprises interconnected and axially extending tubing sections disposed in internal peripheral relation to the well.

8. The apparatus of claim 7, wherein the tubing sections are partially flattened towards the periphery of the well.

9. The apparatus of claim 6, wherein the circulation prolonging means comprises a chamber within the respective heat absorbing zone having an expanded cross-sectional flow area to reduce the linear flow rate of the respective fluid through the respective heat absorbing zone.

10. The apparatus of claim 1, including conduit support means within the well for dividing the first and second heat absorbing zones and operatively interconnecting the conduit means with the heat transfer means.

11. The apparatus of claim 4, including conduit support means within the well for dividing the first and second heat absorbing zones and operatively interconnecting the inner tube with the first heat transfer means and the outer tube with the second heat transfer means.

12. The apparatus of claim 5, including conduit support means within the well for dividing the first and second heat absorbing zones and operatively interconnecting the inner tubes with the first heat transfer means and the outer tubes with the second heat transfer means.

13. An apparatus for recovering geothermal energy from a plurality of selected heat zones of a wellbore by using a separate heat transfer fluid for each selected heat zone, the apparatus comprising:

means for injecting and discharging the fluids into and out of the wellbore at respective linear flow rates, including conduit means for conducting the fluids in separate parallel flow paths down from and up to the top of the well;

heat transfer means connected to the conduit means for separately circulating the fluids through the selected heat zones within the well.

14. An apparatus for recovering geothermal energy from a wellbore by using a heat transfer fluid and a heat insulating fluid, the apparatus comprising:

means for respectively injecting the fluids into the wellbore, including two coaxial injection tubes, the inner injection tube for conducting the heat transfer fluid and the outer injection tube for conducting the heat insulating fluid down the well in heat exchange relationship with each other;

first heat transfer means connected to the inner injection tube for circulating the heat transfer fluid through a primary heat absorbing zone;

second heat transfer means connected to the outer injection tube for circulating the heat insulating fluid through a secondary heat absorbing zone above the primary heat absorbing zone;

means for respectively discharging the fluids out of the wellbore, including two coaxial discharge tubes, the inner discharge tube connected to the first heat transfer means and the outer discharge tube connected to the second heat transfer means, the inner discharge tube for conducting the heat transfer fluid and the outer discharge tube for conducting the heat insulating fluid up the well in heat exchange relationship with each other.

* * * * *

UNITED STATES PATENT AND TRADEMARK OFFICE
CERTIFICATE OF CORRECTION

PATENT NO. : 4,776,169

DATED : October 11, 1988

INVENTOR(S) : Otis C. Coles, Jr.

It is certified that error appears in the above-identified patent and that said Letters Patent is hereby corrected as shown below:

Column 1, line 34, delete the word "fro" and insert --from--.

Signed and Sealed this

Twenty-third Day of May, 1989

Attest:

DONALD J. QUIGG

Attesting Officer

Commissioner of Patents and Trademarks